(12) United States Patent
Pfeifer et al.

(10) Patent No.: US 8,596,862 B1
(45) Date of Patent: Dec. 3, 2013

(54) WIRELESS PASSIVE RADIATION SENSOR

(75) Inventors: Kent B. Pfeifer, Los Lunas, NM (US);
Arthur N. Rumpf, Albuquerque, NM (US); William G. Yelton, Sandia Park, NM (US); Steven J. Limmer, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 52 days.

(21) Appl. No.: 13/540,465

(22) Filed: Jul. 2, 2012

Related U.S. Application Data

(63) Continuation-in-part of application No. 12/871,602, filed on Aug. 30, 2010, now Pat. No. 8,240,911.

(51) Int. Cl.
*G01K 11/26* (2006.01)

(52) U.S. Cl.
USPC .................................. 374/117; 374/E11.011

(58) Field of Classification Search
USPC ......... 374/117–120, 110, 137, 184, 187, 208, 374/E11.011
See application file for complete search history.

(56) References Cited

U.S. PATENT DOCUMENTS

| | | | |
|---|---|---|---|
| 8,240,911 B1 * | 8/2012 | Pfeifer et al. .................. | 374/117 |
| 8,348,504 B2 * | 1/2013 | Gregory et al. ................ | 374/152 |
| 2011/0156916 A1 | 6/2011 | Savignac et al. | |
| 2013/0003779 A1 * | 1/2013 | Fukuda et al. ................. | 374/117 |
| 2013/0136152 A1 * | 5/2013 | Draeger et al. ............... | 374/183 |

OTHER PUBLICATIONS

M. Viens and J. David N. Cheeke, Highly Sensitive Temperature Sensor Using SAW Resonator Oscillator, Sensors and Actuators A, 24 (1990), pp. 209-211.
L. Mingfang and L. Haiguo, SAW Temperature and Humidity Sensor with High Resolution, Sensors and Actuators B, 12 (1993), pp. 53-56.
J.D. Sternhagen, et al., A Novel Integrated Acoustic Gas and Temperature Sensor, IEEE Sensors Journal, vol. 2, No. 4 (Aug. 2002), pp. 301-306.
G. Scholl, et al., Surface Acoustic Wave Devices for Sensor Applications, Phys. Stat. Sol. (a) 185, No. 1 (2001), pp. 47-58.
A. Von Jena, et al., Intelligent Sensor for Monitoring Freight-Waggon Working Conditions, Sensors and Actuators A, 41-42 (1994), pp. 347-353.

* cited by examiner

*Primary Examiner* — Yaritza Guadalupe-McCall
(74) *Attorney, Agent, or Firm* — Kevin W. Bieg

(57) ABSTRACT

A novel measurement technique is employed using surface acoustic wave (SAW) devices, passive RF, and radiation-sensitive films to provide a wireless passive radiation sensor that requires no batteries, outside wiring, or regular maintenance. The sensor is small (<1 cm$^2$), physically robust, and will operate unattended for decades. In addition, the sensor can be insensitive to measurement position and read distance due to a novel self-referencing technique eliminating the need to measure absolute responses that are dependent on RF transmitter location and power.

11 Claims, 5 Drawing Sheets

WIRELESS PASSIVE RADIATION SENSOR

CROSS-REFERENCE TO RELATED APPLICATION

This application is a continuation-in-part of application Ser. No. 12/871,602, filed Aug. 30, 2010, now U.S. Pat. No. 8,240,911 which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to radiation detection and, in particular, to a wireless passive radiation sensor.

BACKGROUND OF THE INVENTION

Surface acoustic wave (SAW) devices have been demonstrated to function linearly as sensors over a broad variation of physical quantities and they have been employed as wireless tags for tracking of high-value assets in addition to various types of wireless sensors. See M. Viens and J. D. N. Cheeke, "Highly Sensitive Temperature Sensor Using SAW Resonator Oscillator," *Sensors and Actuators A* 24, 209 (1990); L. Mingfang and L. Haiguo, "SAW temperature and humidity sensor with high resolution," *Sensors and Actuators B* 12, 53 (1993); J. D. Sternhagen et al., "A Novel Integrated Acoustic Gas and Temperature Sensor," *IEEE Sensors Journal* 2 (4), 301 (2002); G. Scholl et al., "Surface Acoustic Wave Devices for Sensor Applications", *Phys. Stat. Sol. A* 185 (1), 47 (2001); and A. von Jena et al., "Intelligent Sensor for Monitoring Freight-Waggon Working Conditions," *Sensors and Actuators A* 42, 347 (1994). Wireless tagging and sensing applications require a method of self-identification, such as a unique photo-lithographically patterned bit sequence of reflection structures, to be fabricated on the device during manufacture. These bit sequences allow a unique identification code to be hardwired into a SAW device, enabling identification of the particular part. This bit sequence requires each part on the wafer to have a unique photo-mask and thus increases fabrication cost during dicing and packaging due to tracking requirements on that unique part. In addition, some of the energy received by the SAW device via the antenna is used for the identification and thus reduces the energy available for the sensing measurement.

For application as a sensor, there must be some environmentally introduced change in the wireless SAW response that can be detected by a readout device. An example of this type of sensor is described in the literature where the phase angle of a reflected signal is monitored as a function of pressure or temperature using a network analyzer. See G. Scholl et al. This type of sensor response is good for monitoring pressure, strain, and torque, but is limited by the expense and portability of the readout hardware. Further, SAW devices typically operate at frequencies in the range of 100 MHz to several GHz, making the monitoring of the phase and individual waves impractical for portable, inexpensive systems.

Existing small radiation detectors do not produce an immediate real-time warning of radiation doses because the detectors need to be sent to a lab for readout, which can require days or weeks to complete. Other detectors are fragile, need human interpretation of colors, cost hundreds of dollars each or are not easily mass produced.

Therefore, a need remains for a wireless passive radiation sensor that can remotely detect radiation using a portable, inexpensive transceiver.

SUMMARY OF THE INVENTION

The present invention is directed to a wireless passive radiation sensor, comprising a piezoelectric substrate; a launch interdigital transducer, disposed on the surface of the piezoelectric substrate and adapted to launch a surface acoustic wave at a resonance frequency in the piezoelectric substrate when an RF electric field is applied across the launch interdigital transducer; a sensor interdigital transducer, disposed in the acoustic path of and spaced a delay length from the launch interdigital transducer on the piezoelectric substrate and adapted to at least partially reflect the launched surface acoustic wave back to the launch interdigital transducer; and a radiation-sensitive film electrically connected to the sensor interdigital transducer that changes impedance when exposed to radiation and wherein the amplitude of the reflected surface acoustic wave is sensitive to the impedance change of the radiation-sensitive film. For example, the piezoelectric substrate can comprise lithium niobate, lithium tantalate, gallium arsenide, quartz, or other suitable piezoelectric material. For example, the radiation-sensitive film can comprise a metal-halide-containing polymer film or a metal halide film. The radiation sensor can further comprise a reflection interdigital transducer, disposed in the acoustic path of the launch interdigital transducer opposite to and spaced a different delay length than the sensor interdigital transducer on the piezoelectric substrate and adapted to at least partially reflect the launched surface acoustic wave back to the launch interdigital transducer to provide a self-referencing radiation sensor. The radiation sensor can further comprise an antenna adapted to receive a transmitted RF pulse and apply the RF electric field across the launch interdigital transducer to launch the surface acoustic wave, and to retransmit an RF pulse from the reflected surface acoustic wave received by the launch interdigital transducer. A remote burst transmitter can apply an RF pulse to the antenna with a carrier tuned the resonance frequency of the launch interdigital transducer. A reader can receive the retransmitted RF pulse from the antenna.

The radiation sensor can be triggered by ionizing radiation e.g., gamma or neutron radiation. On exposure to a given level of radiation, the radiation-sensitive film can switch from high resistance (e.g., $>10^5 \Omega$) to low resistance (e.g., $<10^2 \Omega$). The radiation-sensitive film forms catalytic sites when electrons are ionized from the molecules due to a radiation event and the resulting cascade reaction converts the initially dielectric film to a conductive metallic film. This response covers several orders-of-magnitude change in resistance after a minimum threshold-limit is reached. The sensor is analogous to a "smoke detector" in that it detects either the presence or absence of radiation. The sensor is comprised of non-moving parts, RF monitor, sensor film, and sensor chemistry, enclosed in a robust package. The advantage of this radiation sensor is its size, simplicity, and immediate response. The sensors do not require batteries that add unacceptable mass and maintenance to the structure or wires to retrieve the data, enabling remote sensing.

The invention is further directed to an addressable array comprising at least two wireless passive radiation sensors, wherein the resonance frequency and/or the delay time of each of the radiation sensors is different. Large arrays of self-identifying sensors can be pre-positioned for radiation detection of an environment. Variation of the SAW characteristic delay and center frequency allow the manufacture of inexpensive, robust, self-identifying sensor element arrays that can be read using a single antenna and data acquisition system.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

Figure 1:
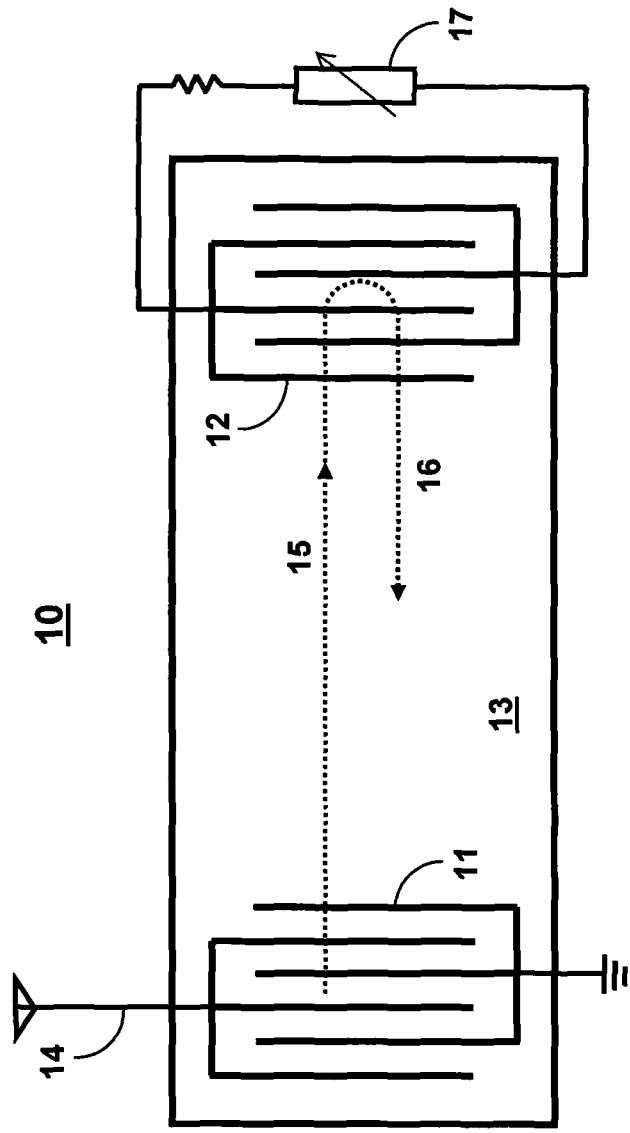
FIG. 1 is a schematic illustration of a wireless passive radiation sensor comprising a surface acoustic wave (SAW) delay line that is constructed on a piezoelectric substrate.

The wireless passive radiation sensor of the present invention is based on the change in minimum insertion loss of a SAW delay line due to a radiation-induced change in the impedance of a radiation-sensitive film. FIG. 1 is a schematic illustration of a wireless passive radiation sensor 10 of the present invention. The sensor 10 uses a SAW delay line, comprising two opposing comb-like interdigital transducers (IDTs): a launch IDT 11 and a sensor IDT 12. Each IDT comprises a fingerlike periodic pattern of parallel in-plane electrodes that can be photo-lithographically patterned on the surface of a piezoelectric substrate 13. The substrate 13 preferably comprises a piezoelectric material with a high mechanical coupling coefficient, such as $LiNbO_3$, $LiTaO_3$, GaAs, quartz, or other suitable piezoelectric substrate. Delay is determined by the center-to-center spacing between the opposing transducers 11 and 12. The resonant frequency is determined by the speed of sound in the piezoelectric substrate and the spacing of the fingers of the IDT electrodes as follows:

$$\lambda = \frac{v_p}{f}$$

where $\lambda$ is twice the center-to-center spacing of the fingers, $v_p$ is the speed of sound in the crystal, and f is the resonant frequency of the sensor. If an electric field is applied across the launch IDT 11, a strain is induced in the piezoelectric substrate 13 as a result of its piezoelectric nature. The electric field can be applied wirelessly to an antenna 14 connected to the launch IDT 11, for example using a burst transmitter (not shown) providing a modulated RF signal operating with a carrier tuned to the resonance frequency of the receiving launch IDT 11. The antenna 14 can be a monopole, dipole, or a directional antenna that is effective in the particular application. RF energy from the burst transmitter is captured by the antenna 14 and converted into an electrical signal across the receiving transducer 11; the induced mechanical strain will then launch an acoustic wave 15 across the surface of the piezoelectric substrate 13. The surface acoustic wave 15 is at least partially reflected by the sensor transducer 12 in the acoustic path. The sensor transducer 12 can comprise an identical IDT to the launch transducer 11, thereby providing a tuned reflector to the acoustic wave 15 on the surface. The reflection is large if the impedance of the sensor IDT 12 is mismatched. For example, when the transducer is connected to an electrical open circuit, the reflection is large since the energy is not dissipated due to the large mismatch at the sensor transducer. Conversely, when the sensor transducer 12 is electrically matched, the reflection is small since the energy is efficiently dissipated in the matching network. The reflected wave 16 can be reconverted into an electromagnetic pulse by the launch transducer 11 and retransmitted by the antenna 14 to a mobile remote reader or transceiver (not shown). See D. S. Ballantine et al., *Acoustic Wave Sensors: Theory, Design, and Physico-Chemical Applications*, San Diego, Calif., Academic Press, pg. 77 (1997); and K. B. Pfeifer et al., "Surface Acoustic Wave Sensing of VOC's in Harsh Chemical Environments," SAND-93-0070, pp. 7-30 (1993).

As described above, since the structure is resonant (i.e. the insertion loss of the device is lowest at the resonant frequency), energy is stored in the form of mechanical stresses in the piezoelectric crystal which then propagate across the crystal and are reflected by the sensor IDT. If the electrical impedance of the series circuit connected to the sensor IDT is matched to the impedance of the IDT, then "good" coupling exists between the two structures and the maximum power is transferred between the IDT and the network. On the other hand, if the structure is impedance mismatched, then a larger fraction of the energy is reflected from the sensor IDT back to the launch/receive IDT and is rebroadcast via the antenna to the reader. Since the speed of sound in the crystal is on the order of 3000 m/s compared to the speed of light ($3 \times 10^8$ m/s), the return pulse is substantially delayed and can be read during a period of relative RF quiet. This is because the RF energy that is not coupled to the device has propagated away from the device allowing only the energy that is stored in the SAW device to be rebroadcast at the resonant frequency in the vicinity of the receive antenna.

For radiation detection, the opposing interdigitated electrodes of the sensor transducer 12 can be electrically connected to a radiation-sensitive film 17 with variable impedance. The radiation sensitive film 17 can comprise a coating covering a pair of electrodes that are photo-lithographically patterned onto a dielectric substrate, such as glass, quartz, or plastic. For example, the film can be either a metal-halide-containing polymer film or a metal halide film, which upon exposure to radiation becomes more conductive. For example, the metal halide can comprise a silver halide, as used in conventional photographic film. X-ray and other film kept in a light-tight chamber is sensitive to ionizing x-ray, gamma, and neutron radiation. When exposed to developer compounds (reducing agents) film granules develop, amplifying the radiation exposure by up to six orders of magnitude. Films useful for radiation thin-film sensors use silver (I) halides of bromine, iodine, and/or chlorine. During this chemical process silver (I) from the insoluble silver halide granules reduces to elemental silver, with concurrent oxidation of the developer chemicals. The halide from the salt complex solubilizes and migrates into the developer solution. The developer chemical may also release hydronium ions upon oxidation (reduction of the silver oxidizes the reducing agents). Ions from both sources serve to increase the conductivity of the solution, which can be observed using simple electronic circuits or sensors, as described in Pub. No. US 2011/0156916, which is incorporated herein by reference. The radiation dose can be determined continuously over a wide dosage range that is predetermined at the time of device manufacture.

Figure 2:
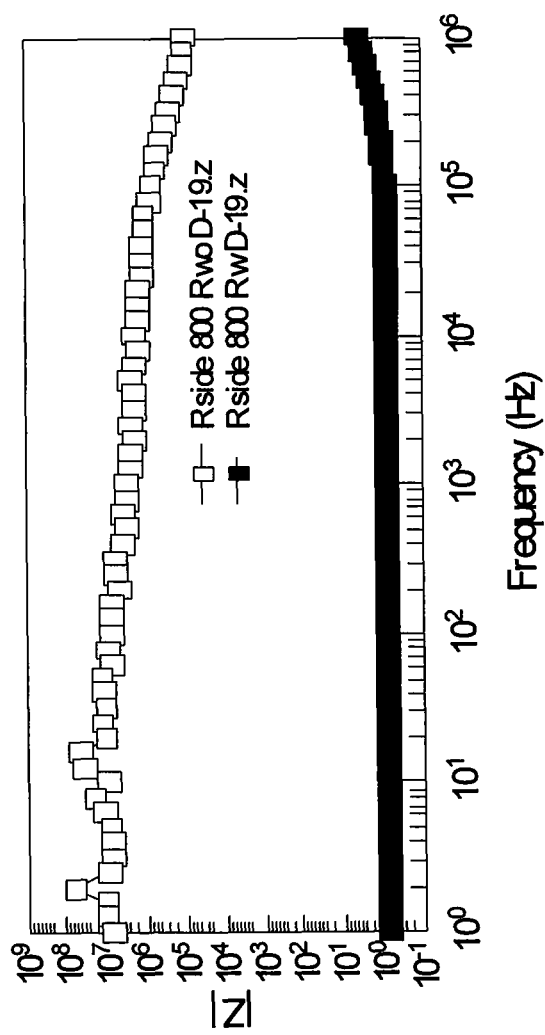
FIG. 2 is a graph of the response of impedance [Z] of silver halide films exposed to 800 REM from Ce 137 with/without conversion chemistry at frequencies from 1 to million Hz. Upon exposure, radiation from gamma creates catalyst sites in the film, but requires chemistry on the film to completely convert a high [Z] impedance film to low [Z] impedance.
Figure 3:
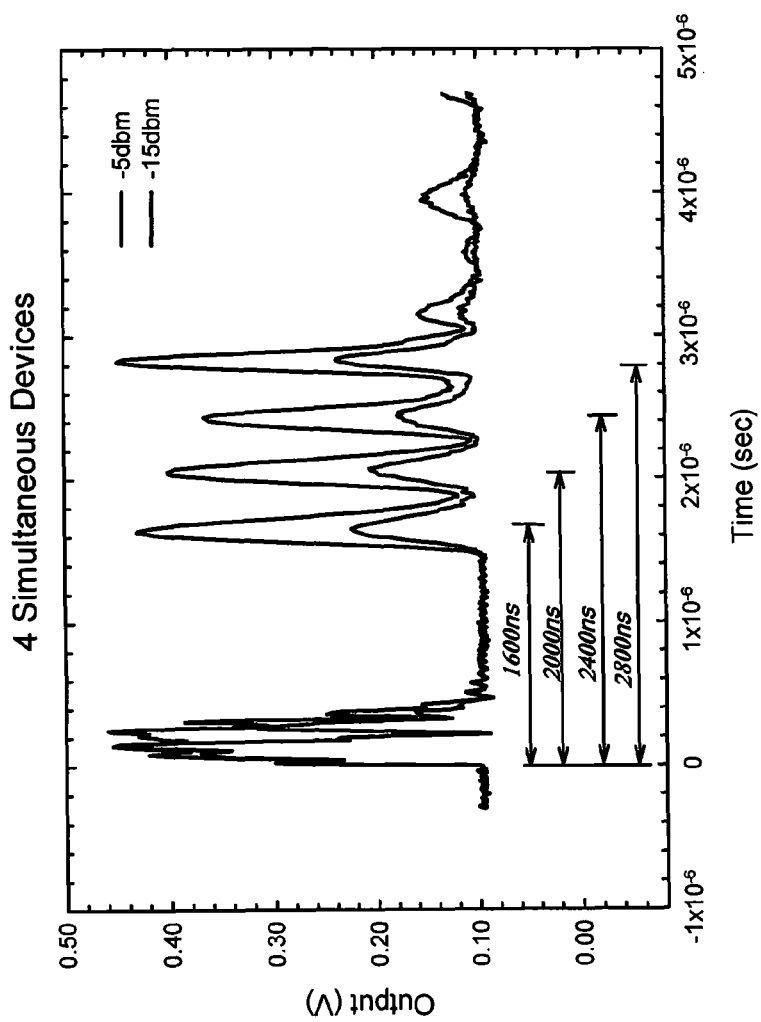
FIG. 3 is a graph of the response of four sensors with different delays being probed by a single measurement pulse at two discrete power levels.

FIG. 2 is a graph of the response of impedance [Z] of radiation-sensitive films exposed to 800 REM from Ce 137 with/without conversion chemistry at frequencies from 1 to million Hz. The radiation-sensitive film used in this example comprised an evaporated silver film that was chemically converted to a silver halide film. In the unexposed state, the silver halide film is poorly conducting, providing high impedance. However, when exposed to a given threshold level of radiation, enough catalyzed sites are created so that the chemistry quickly cascades a conversion reaction of the high-impedance film to a low-impedance film. Once converted, the conductivity of the film increases by orders of magnitude. As the film drops below a known resistance that matches the impedance of the IDT, then proper coupling exists between the IDT and the load for maximum power transfer. The film is nominally resistive, implying that energy will be lost in the load and will not be reflected back to the reader. Thus, a low-reflection will imply that the film has been exposed to radiation. Therefore, measurement of the acoustic mismatch causes the conductivity of the radiation-sensitive film to change and thus changes the amplitude of the reflected acoustic pulse allowing measurement of the radiation dose. Thus, the amplitude of the reflected pulse will be an indication of the impedance of the radiation-sensitive film and the timing of the pulse can be used to uniquely identify an individual sensor with a known delay. FIG. 3 shows data for four devices with differing delay operated simultaneously illustrating how these devices can be used for multiple simultaneous measurements.

Figure 4:
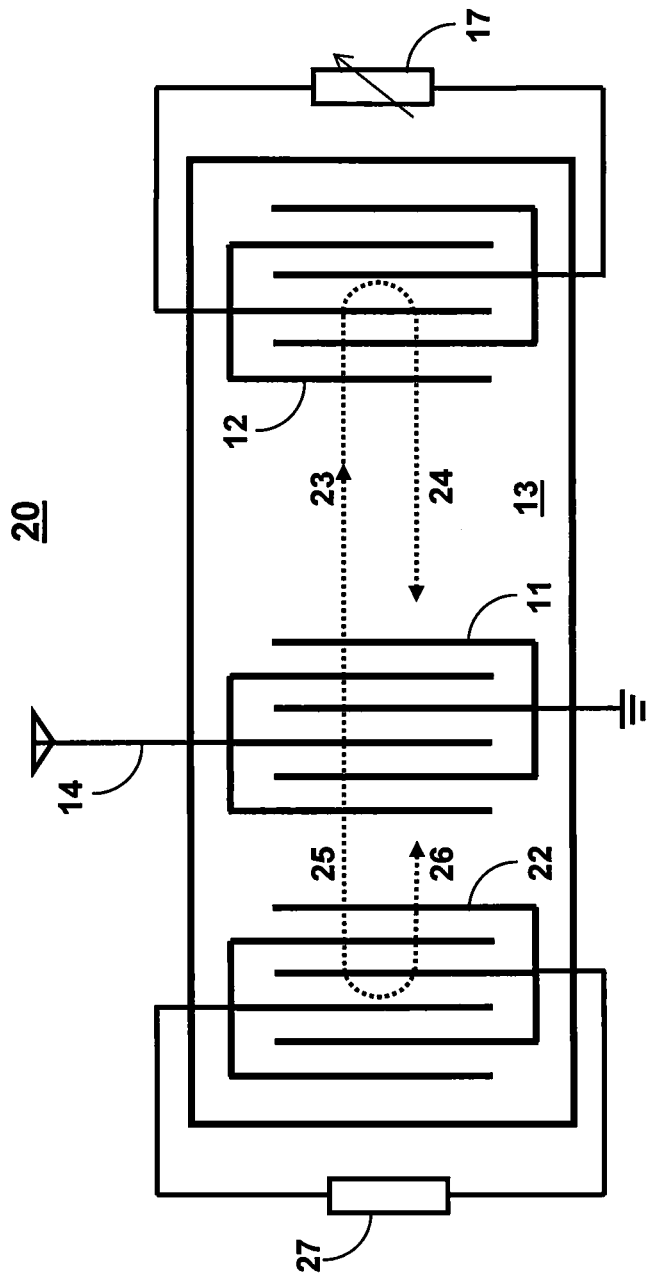
FIG. 4 is a schematic illustration of a self-referencing radiation sensor comprising a reference IDT and a sensor IDT connected to a radiation-sensitive film.

However, the amplitude is also dependent on the RF power at the antenna which is a function of range from transmitter to the sensor. FIG. 4 illustrates a method of self-referencing the sensor to eliminate this problem. The self-referencing radiation sensor 20 comprises two reflection IDTs 12 and 22 that are spaced at different distances from the transmit/receive IDT 11. As before, an electric field can be applied wirelessly to an antenna 14 using a burst transmitter or transceiver (not shown) operating with a carrier tuned to the resonance frequency of the receiving launch IDT 11. RF energy from the burst transmitter is captured by the antenna 14 and converted into an electrical signal across the receiving transducer 11; the induced mechanical strain will then launch acoustic waves 23 and 25 in both directions across the surface of the piezoelectric substrate 13. The surface acoustic wave 23 is at least partially reflected 24 by the sensor transducer 12 in the acoustic path. A fixed amplitude reference is provided by the reflection IDT 22 with fixed impedance 27 that is independent of radiation dose. The sensor IDT 12 can be connected to a radiation-sensitive film 17 with variable impedance. The reflection amplitude of the sensor IDT 12 is related to both the RF power and the impedance of the radiation film 17. Therefore, acoustic waves 23 and 25 are launched in both directions and return at different times due to different delay path lengths from the opposing transducers 12 and 22. In this example, the first reflected pulse 26 is received from the fixed transducer 22 at an earlier time due to its shorter path length. Thus, by comparing the ratio of the reference to the sensor pulse amplitudes, the radiation state of the film 17 can be determined. The signal pulse 24 is received from the sensor transducer 12 at a later time and the ratio of the amplitudes of the two reflected pulses provides the power-corrected signal from the sensor transducer 12. Therefore, the ratio allows for compensation due to differences in transmitted RF power and distance of the self-referencing sensor 20 to the wireless transceiver.

Figure 5:
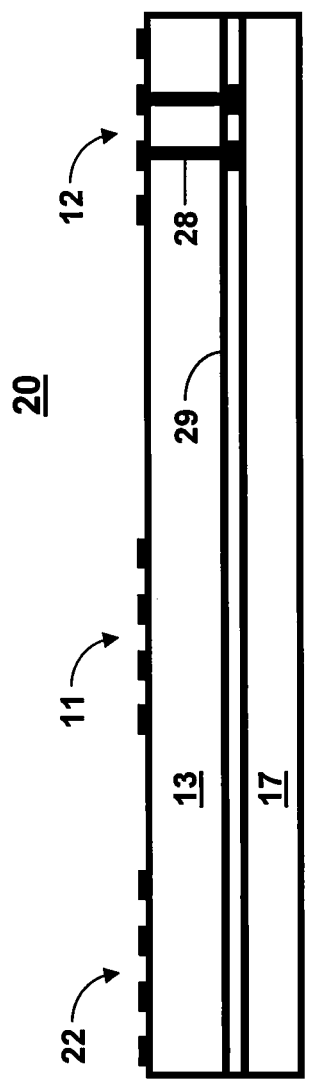
FIG. 5 is a schematic illustration of monolithic radiation sensor with SAW device fabricated on the piezoelectric substrate and vias connecting to a radiation film fabricated on the back side of the sensor. The sensor can be wire-bonded in a hermetically sealed package and wired to the antennas.

A simple monolithic structure can be constructed using the piezoelectric substrate to form both the SAW and the film substrate as illustrated in FIG. 5. The piezoelectric substrate 13 forms the backbone of the sensor 20 and has the SAW transmit/receive IDT 11, sensor IDT 12, and reflection IDT 22 photo-lithographically patterned on the top surface to form the SAW device. The sensor IDT 12 is then connected by way of vias 28 formed in the substrate 13 through to the bottom of the device to make electrical connection to the radiation film 17. A passivation layer 29 can be placed between the radiation film 17 and the piezoelectric substrate 13 to prevent contamination of the radiation film by the materials of the piezoelectric substrate. The device can then be packaged in a hermetic package and wired to an antenna. The sensor can then be placed in the radiation environment and periodically queried to determine the radiation dose by an external reader.

The present invention has been described as a wireless passive radiation sensor. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A wireless passive radiation sensor, comprising:
   a piezoelectric substrate;
   a launch interdigital transducer, disposed on the surface of the piezoelectric substrate and adapted to launch a surface acoustic wave at a resonance frequency in the piezoelectric substrate when a RF electric field is applied across the launch interdigital transducer;
   a sensor interdigital transducer, disposed in the acoustic path of and spaced a delay length from the launch interdigital transducer on the piezoelectric substrate and adapted to at least partially reflect the launched surface acoustic wave back to the launch interdigital transducer; and
   a radiation-sensitive film electrically connected to the reflection interdigital transducer that changes impedance when exposed to radiation and wherein the amplitude of the reflected surface acoustic wave is sensitive to the impedance change of the radiation-sensitive film.

2. The radiation sensor of claim 1, wherein the piezoelectric substrate comprises lithium niobate, lithium tantalate, gallium arsenide, or quartz.

3. The radiation sensor of claim 1, wherein the radiation-sensitive film comprises a metal-halide-containing polymer film or a metal halide film.

4. The radiation sensor of claim 1, further comprising a reflection interdigital transducer, disposed in the acoustic path of the launch interdigital transducer opposite to and spaced a different delay length than the sensor interdigital transducer on the piezoelectric substrate and adapted to at least partially reflect the launched surface acoustic wave back to the launch interdigital transducer.

5. The radiation sensor of claim 1, further comprising an antenna adapted to receive a transmitted RF pulse and apply the RF electric field across the launch interdigital transducer to launch the surface acoustic wave, and to retransmit an RF pulse from the reflected surface acoustic wave received by the launch interdigital transducer.

6. The radiation sensor of claim 5, further comprising a remote burst transmitter adapted to transmit to the antenna the transmitted RF pulse with a carrier tuned to the resonance frequency of the launch interdigital transducer.

7. The radiation sensor of claim 5, further comprising a reader adapted to receive the retransmitted RF pulse from the antenna.

8. An addressable array comprising at least two wireless passive radiation sensors, each radiation sensor comprising:
   a piezoelectric substrate;
   a launch interdigital transducer, disposed on the surface of the piezoelectric substrate and adapted to launch a surface acoustic wave at a resonance frequency in the piezoelectric substrate when an RF electric field is applied across the launch interdigital transducer;
   a sensor interdigital transducer, disposed in the acoustic path of and spaced a delay length from the launch interdigital transducer on the piezoelectric substrate and adapted to at least partially reflect the launched surface acoustic wave back to the launch interdigital transducer; and
   a radiation-sensitive film electrically connected to the sensor interdigital transducer that changes impedance when exposed to radiation and wherein amplitude of the reflected surface acoustic wave is sensitive to the impedance change of the radiation-sensitive film; and
   wherein the resonance frequency and/or the delay time of each of the radiation sensors is different.

9. The addressable array of claim 8, wherein each radiation sensor further comprises an antenna adapted to receive a transmitted RF pulse and apply the RF electric field across the launch interdigital transducer to launch the surface acoustic wave, and to retransmit an RF pulse from the reflected surface acoustic wave received by the launch interdigital transducer.

10. The addressable array of claim 9, further comprising a remote burst transmitter adapted to transmit to each antenna a series of transmitted RF pulses, each pulse having a carrier tuned to a different resonance frequency of each of the launch interdigital transducers.

11. The addressable array of claim 9, further comprising a reader adapted to receive the retransmitted RF pulses from each antenna.

* * * * *